2,899,430
Patented Aug. 11, 1959

2,899,430

SENSITIZING DYES CONTAINING A 6,7-DIHYDRO-4-H-PYRANO (4,3D)-THIAZOLE NUCLEUS

Robert H. Sprague, East Hampton, Conn., assignor to Sperry Rand Corporation, a corporation of Delaware No Drawing. Application March 22, 1955
Serial No. 496,057

19 Claims. (Cl. 260—240.4)

This invention relates to cyanine dyes containing a 6,7-dihydro-4-H-pyrano (4,3d) thiazole nucleus and to processes for preparing such dyes.

Cyanine dyes contain at least two auxochromic nitrogen atoms, the one ternary and the other quaternary, the one nitrogen atom lying in one heterocyclic nucleus and the other lying in another heterocyclic nucleus, the two nitrogen atoms being connected by a conjugated carbon chain. A number of cyanine dyes containing the 4,5,6,7-tetrahydrobenzothiazole nucleus are known.

I have now found that it is possible to prepare cyanine dyes in which one or both of the above mentioned auxochromic nitrogen atoms lie in a 6,7-dihydro-4-H-pyrano-(4,3d) thiazole nucleus. I have further found that these new cyanine dyes sensitize photographic emulsions strongly and cleanly, i.e. without producing excessive fog or residual dye stain.

It is accordingly an object of my invention to provide new cyanine dyes. A further object is to provide photographic emulsions sensitized with such dyes. Other objects will appear hereinafter.

As starting material for the preparation of my new dyes I employ 2-alkyl-6,7-dihydro-4-H-pyrano (4,3d) thiazoles, particularly 2-methyl-6,7-dihydro-4-H-pyrano (4,3d) thiazole. I first convert these alkyl-6,7-dihydro-4-H-pyrano (4,3d) thiazole bases to quaternary salts by reacting the bases with esters, such as alkyl halides, alkyl sulfates, or alkyl-p-toluene sulfonates, for example. For purposes of convenience the quaternary salts useful in practicing this invention can be represented by the following single formula:

(I)

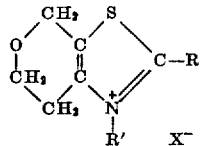

wherein R' represents an alkyl group, e.g. methyl, ethyl, n-propyl, isobutyl, n-butyl, β-hydroxyethyl, β-methoxyethyl, β-ethoxyethyl, β-acetoxyethyl, β-carboxyethyl, carboxymethyl, β-carbomethoxyethyl, β-carbethoxyethyl, allyl, etc. or an aralkyl group, e.g. benzyl, phenyl-ethyl, etc., R represents methyl, ethyl or n-propyl and X⁻ represents an anion, e.g. chloride, bromide, iodide, benzene sulfonate, p-toluene sulfonate, methyl sulfate, ethyl sulfate, thiocyanate perchlorate, acetate, etc.

To prepare pseudocyanine dyes from such quaternary salts I react the quaternary salts with 2-halogenoquinoline quaternary salts, in the presence of an acid binding agent, such, for example, as sodium ethylate, sodium carbonate, pyridine or a strong organic base (e.g. triethylamine, trimethylamine and N-methylpiperidine). I have found it advantageous to employ a mixture of pyridine with a strong tertiary organic base.

Instead of 2-halogenoquinoline quaternary salts I can employ 2-alkyl mercapto or 2-aryl mercaptoquinoline quaternary salts to condense with the quaternary salts of 2-alkyl-6,7-dihydro-4-H-pyrano (4,3d) thiazole in the presence of an acid binding agent.

Using 2-halogenopyridine quaternary salts instead of 2-halogenoquinoline quaternary salts I can prepare pyridocyanine dyes containing a 6,7-dihydro-4-H-pyrano (4,3d) thiazole nucleus.

Using 2-alkyl mercapto or 2-aryl mercaptobenzothiazole or naphthothiazole salts I can prepare simple cyanine dyes other than pseudocyanine dyes.

To prepare symmetrical carbocyanine dyes from 2-alkyl-6,7-dihydro-4-H-pyrano (4,3d) thiazole quaternary salts, I react the quaternary salts with esters of ortho acids, e.g. ethyl orthoformate, ethylorthoacetate, ethyl orthopropionate and ethyl orthobenzoate in the presence of pyridine or a mixture of pyridine and triethyl amine.

To prepare unsymmetrical carbocyanine dyes from 2-alkyl-6,7-dihydro-4-H-pyrano (4,3d) thiazole quaternary salts I react the quaternary salts with cycloammonium quaternary salts containing a β-aryl aminovinyl group in the alpha or gamma position, i.e. in one of the so-called reactive positions in the presence of an acid binding agent, e.g. pyridine or pyridine plus triethyl amine.

To prepare dicarbocyanine dyes from 2-alkyl-6,7-dihydro-4-H-pyrano (4,3d) thiazole quaternary salts I react the quaternary salts with cycloammonium quaternary salts containing an ω-aryl amino butadienyl group in the alpha or gamma position in the presence of an acid binding agent, e.g. triethylamine in pyridine.

To prepare styryl dies from my new quaternary salts I condense them with a p-dialkyl aminobenzaldehyde in the presence of an alkaline catalyst, e.g. piperidine in absolute ethanol solution.

To prepare merocarbocyanine dyes from 2-alkyl-6,7-dihydro-4-H-pyrano (4,3d) thiazole quaternary salts I condense the quaternary salts with ketomethylene heterocyclic intermediates containing an aryl aminomethylene group in the 5-position in the presence of an acid binding agent, e.g. pyridine plus triethylamine. Examples of such ketomethylene intermediates are 5-acetanilidomethylene-3-ethyl rhodanine, 5-acetanilidomethylene-3-ethyl-1-phenyl-2-thiohydantoin etc.

To prepare pyrrolocarbocyanines useful as photographic filter and backing dyes I condense my new quaternary salts with 1-phenyl-2,5-dimethyl-3-pyrrole carboxaldehyde in the presence of an alkaline catalyst, e.g. piperidine in absolute ethanol solution.

To prepare styryl dye bases useful as supersensitizers from my new base 2-methyl-6,7-dihydro-4-H-pyrano (4,3d) thiazole I condense the base with a p-dialkyl aminobenzaldehyde in the presence of an acid catalyst, e.g. anhydrous zinc chloride.

The 2-alkyl-6,7-dyhydro-4-H-pyrano (4,3d) thiazoles and quaternary salts derived from them of the general Formula I above are new chemical compounds which have not been reported in the chemical literature. I have found that thio amides, e.g. thioacetamide or thio propionamide will react with 3-bromo-2,3,5,6-tetrahydro-4-pyranone when heated in absolute alcohol solutions (or in the absence of solvent) to yield the new pyranothiazole bases of this invention. I have found that it is advantageous to employ a solvent in the reaction, e.g. absolute ethanol, n-propanol, etc.

The following examples will serve to demonstrate the manner of preparation of my new bases, quaternary salts and dyes. These examples are not, however, intended to limit my invention.

*Example 1.—2-methyl-6,7-dihydro-4-H-pyrano (4,3d) thiazole*

99.6 g. (1 mol) of 3-bromo-2,3,5,6-tetrahydro-4-pyranone, 29 g. (1 mol) of thioacetamide and 100 ml. of absolute ethanol were heated to boiling under reflux.

After the initial vigorous reaction subsided the mixture was refluxed for one hour on the steam bath. The mixture was chilled, filtered with suction and the filtrate was evaporated nearly to dryness. The residue was extracted repeatedly with warm dilute hydrobromic acid, the aqueous extract was chilled, basified with NaOH sol'n and the oily precipitate taken up in ether. The ether sol'n was dried with $K_2CO_3$, evaporated and distilled under reduced pressure. The product was a nearly colorless oil boiling at 135 to 136°/35 mm. The yield was 16.5 g., 31% of theoretical.

Example 2.—*2-methyl-6,7-dihydro-4-H-pyrano(4,3d) thiazole metho-p-toluene sulfonate*

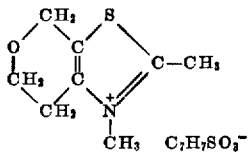

3.0 g. (1 mol) of 2-methyl-6,7 dihydro-4-H-pyrano (4,3d) thiazole and 4.5 g. (1 mol plus 10% excess) of methyl-p-toluene sulfonate were heated on the steam bath for 3 hours. The white crystalline mass was crushed under 20 ml. acetone, filtered, washed with acetone and dried in vacuum over $CaCl_2$. The yield of white crystals melting at 167° was 5.0 g. 68% of theoretical.

Example 3.—*2-methyl-6,7-dihydro-4-H-pyrano(4,3d) thiazole ethiodide*

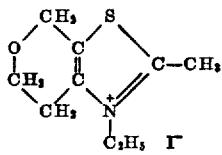

2.1 g. (1 mol) of 2-methyl-6,7-dihydro-4-H-pyrano (4,3d) thiazole and 5.0 g. (1 mol plus excess) of ethyl iodide were refluxed for 24 hours. The product was crushed under acetone, filtered, washed with acetone and dried in vac. over $CaCl_2$. The yield of nearly colorless crystals melting at 142–143° was 3.5 g. 83% of theoretical.

Example 4.—*1'3-dimethyl-6',7'-dihydro oxa-4'-H-pyrano(4,3d) thiazolocarbocyanine iodide*

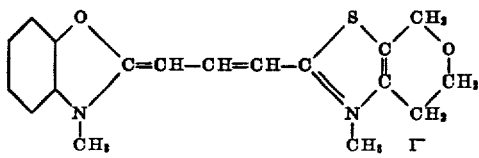

1.7 g. (1 mol) of 2-methyl-6,7-dihydro-4-H-pyrano (4,3d) thiazole metho-p-toluene sulfonate, 2.1 g. (1 mol) of 2-β-acetanilidovinylbenzoxazol methiodide, .5 g. (1 mol) of triethylamine and 15 ml. of pyridine were refluxed for 14 min. The mixture was chilled, the dye collected on a filter, washed with acetone and water and recrystallized from 300 ml. of methanol. The yield of magenta needles melting at 274–275° was 1.3 g., 57% of theoretical.

Example 5.—*1'-ethyl-1-methyl-6,7-dihydro-4-H-pyrano (4,3d) thiazolo-2'-cyanine iodide*

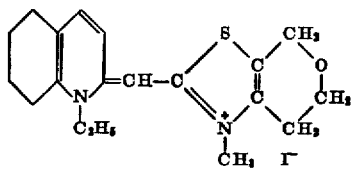

2.05 g. (1 mol) of 2-iodoquinoline ethiodide, 1.7 g. (1 mol) of 2-methyl-6,7-dihydro-4-H-pyrano (4,3d) thiazole metho-p-toluene sulfonate, 1.0 g. (2 mols) of tri- ethylamine and 25 ml. of absolute ethanol were refluxed for 3 hours. The mixture was chilled, the dye collected on a filter, washed with acetone and water and recrystallized from 350 ml. of methanol. The yield of bright red needles melting at 280–281° was 1.3 g., 58% of theoretical.

Example 6.—*1',3-diethyl-6',7'-dihydro-oxa-4'-H-pyrano(4,3d) thiazolocarbocyanine iodide*

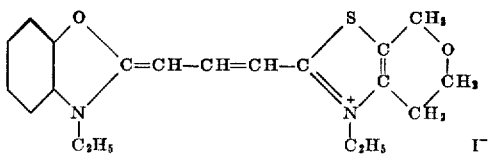

1.56 g. (1 mol) of 2-methyl-6,7-dihydro-4-H-pyrano (4,3d) thiazole ethiodide, 2.17 g. (1 mol of 2-β-acetanilidovinyl benzoxazole ethiodide, .5 g. (1 mol) of triethylamine and 15 ml. of dry pyridine were refluxed for 15 min. The mixture was chilled, ether added to precipitate the dye and the sticky product was stirred with 15 ml. of cold acetone until crystalline. The dye was collected on a filter, washed with acetone and water and recrystallized from 100 ml. of methanol. The yield of red needles melting at 275° was 1.8 g., 75% of theoretical.

Example 7.—*1,1'diethyl-6,7-dihydro-4-H-pyrano (4,3d) thiazolo-2'-cyanine iodide*

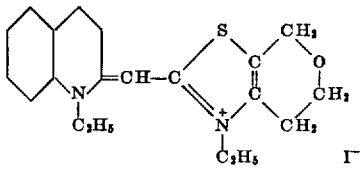

1.56 g. (1 mol) of 2-methyl-6,7-dihydro-4-H-pyrano (4,3d) thiazole ethiodide, 2.06 g. (1 mol) of 2-iodoquinoline ethiodide, 1.0 g. (2 mols) of triethylamine and 25 ml. of absolute ethanol were refluxed for 15 min. The mixture was chilled and the dye collected on a filter, washed with acetone and water and recrystallized from 150 ml. of methanol. The yield of bright red needles melting at 273–274° was 1.5 g., 65% of theoretical.

Example 8.—*3-ethyl-5-[(1-ethyl-6,7-dihydro-4-H-pyrano (4,3d) thiazolyl-(1,2)idene)ethylidene] rhodanine*

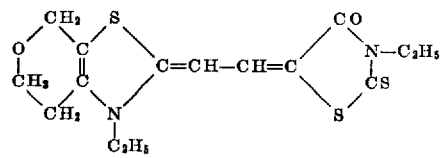

1.56 g. (1 mol) of 2-methyl-6,7-dihydro-4-H-pyrano (4,3d) thiazole ethiodide, 1.5 g. (1 mol) of 5-acetanilidomethylene-3-ethylrhodanine, 1.0 g. (2 mols) of triethyl amine and 25 ml. of absolute ethanol were refluxed for 15 min. The mixture was chilled, the dye collected on a filter, washed with methanol and recrystallized from 1200 ml. of methanol. The yield of minute dark red needles melting at 234–235° was 1.1 g. 61% of theoretical.

Example 9.—*1,1'-dimethyl bis (6,7 - dihydro-4-H-pyrano (4,3d) thiazolocarbocyanine) iodide*

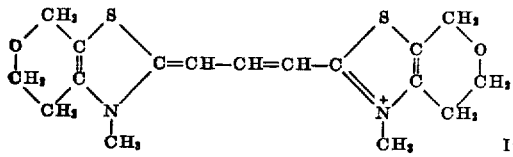

3.4 g. (2 mols) of 2-methyl-6,7-dihydro-4-H-pyrano (4,3d) thiazole metho-p-toluene sulfonate, 3.0 g. (1 mol plus 300% excess) of ethyl orthoformate and 25 ml. of pyridine were refluxed for 90 min. The mixture was chilled, ether added to precipitate the dye and the product stirred with 15 ml. acetone until crystalline. The dye was collected on a filter, redissolved in 30 ml. hot water and precipitated as the iodide salt by addition of excess sodium iodide solution. The product was filtered and washed on the filter with water. After recrystallization from 100 ml. of methanol the dye was obtained as minute dark green crystals with bronze reflex melting above 300° C. The yield was .19 g. 8% of theoretical.

*Example 10.—1,1'-diethyl bis (6,7-dihydro-4-H-pyrano) (4,3d) thiazolocarbocyanine iodide*

This dye was prepared in the same manner as Example 9 from the corresponding ethiodide quaternary salt. The yield of dark green crystals melting above 300° was .16 g., 6% of theoretical.

*Example 11.—2-p-dimethylaminostyryl-6,7-dihydro-4-H-pyrano (4,3d) thiazole ethiodide*

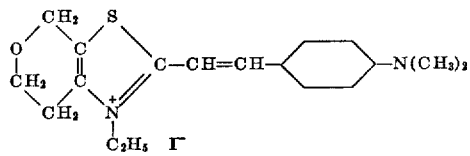

1.56 g. (1 mol) of 2-methyl-6,7-dihydro-4-H-pyrano (4,3d) thiazole ethiodide, 1.5 g. (1 mol) of p-dimethylaminobenzaldehyde, 2 drops of piperidine and 15 ml. of absolute ethanol were refluxed for 60 min. The mixture was chilled, the dye was collected on a filter, washed on the filter with acetone and water and recrystallized from 50 ml. of methanol. The yield of bright red needles melting at 233–5° was 1.3 g., 76% of theoretical.

*Example 12.—5-chloro-1',3-diethyl-6',7'-dihydro oxa-4'-H-pyrano (4,3d) thiazolocarbocyanine iodide*

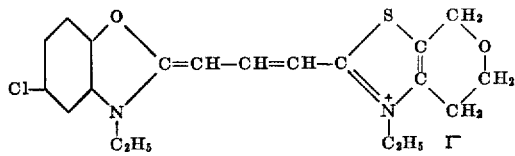

A mixture of 0.3 g. of 2-methyl-6,7-dihydro-4-H-pyrano (4,3d) thiazole ethiodide, 0.5 g. of 2-β-acetanilidovinyl-5-chloro-benzoxazole ethiodide, 0.5 g. of triethylamine and 15 ml. of absolute ethanol was refluxed for 10 min. The mixture was chilled and the dye was collected on a filter and washed with water and acetone. After recrystallization from methanol the dye was obtained in the form of garnet needles which melted with decomposition at 292–293°. The yield of purified dye was .35 g. 67% of theoretical. A methanol solution has an absorption maximum at 516 mu.

*Example 13.—1',3-dibenzyl-6',7'-dihydro-4'-H-oxa-pyrano(4,3d) thiazolocarbocyanine bromide*

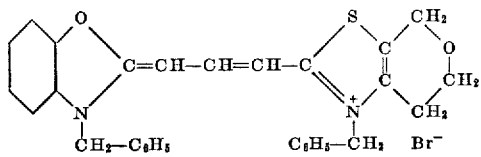

A mixture of 1.55 g. of 2-methyl-6,7-dihydro-4-H-pyrano (4,3d) thiazole and 2.0 g. of benzyl bromide was heated on the steam bath for 24 hours. The product was mixed with 4.5 g. of 2-β-acetanilidovinyl-benzoxazole benzobromide, 1.0 g. of triethylamine and 25 ml. of pyridine and the solution was refluxed for 20 min. The mixture was cooled, diluted with ether and the precipitate was stirred with acetone until crystalline. After standing overnight the dye was collected on a filter, washed with acetone and water and recrystallized from methanol. The yield of steel blue needles of dye was 1.1 g., 20% of theoretical. The pure dye melted with decomposition at 277–228° C. A solution of the dye in methanol has an absorption maximum at 518 mu.

*Example 14.—3,1'-diethyl-5,6-dimethyl-6',7'-dihydro-4'-H-oxapyrano (4,3d) thiazolocarbocyanine iodide*

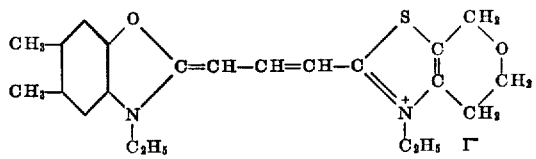

This dye was prepared in the same manner as Example 12 from 2-β-acetanilidovinyl-5,6-dimethylbenzoxazole etho ethyl sulfate and 2-methyl-6,7-dihydro-4-H-pyrano (4,3d) thiazole ethiodide. The dye was obtained in the form of green needles which melted at 263–264° dec. The yield of purified dye was 59% of theoretical. A methanol solution of the dye has an absorption maximum at 526 mu.

*Example 15.—1',3-diethyl-5-phenyl-6',7'-dihydro-4'-H-oxapyrano(4,3d) thiazolocarbocyanine iodide*

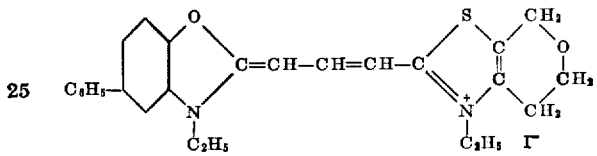

The dye was prepared in the same manner as Example 12 from 2-β-acetanilido vinyl - 5 - phenyl-benzoxazole ethiodide and 2 - methyl-6,7-dihydro-4-H-pyrano(4,3d) thiazole ethiodide. The dye was obtained in the form of bright red prisms which melted with decomposition at 274–275° C. The yield of purified dye was 72% of theoretical. A methanol solution of the dye has an absorption maximum at 524 mu.

*Example 16.—1,1' - diethyl-3,3-dimethyl-6',7'-dihydro-4'-H-pseudoindolo pyrano (4,3d) thiazolocarbocyanine iodide*

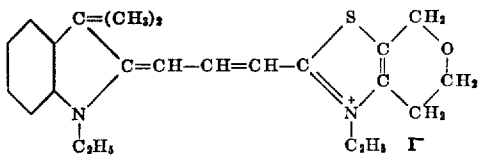

A mixture of 1.1 g. of 1-ethyl-3,3-dimethyl-2-formylmethylene indolenine, 1.55 g. 2-methyl-6.7-dihydro-4-H-pyrano (4,3d) thiazole ethiodide and 15 ml. of acetic anhydride was refluxed for 5 min. The mixture was cooled, diluted with ether and the dye was collected on a filter. After washing with acetone and water the product was recrystallized from absolute ethanol. The dye was obtained in the form of red crystals with a golden reflex. The yield of purified material melting at 165–167° was 1.4 g., 55% of theoretical. A methanol solution of the dye has an absorption maximum at 526 mu.

*Example 17.—3'-ethyl-2,5-dimethyl - 1 - phenyl-6',7'-dihydro-4'-H-3-pyrrolo pyrano (4,3d) thiazolocarbocyanine iodide*

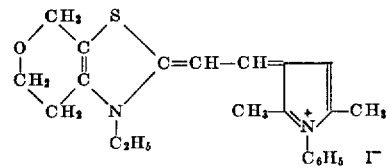

A mixture of 1.0 g. of 2,5-dimethyl-1-phenyl-3-pyrrole carboxaldehyde, 1.55 g. of 2-methyl-6,7-dihydro-4-H-pyrano (4,3d) thiazole ethiodide, 15 ml. of absolute ethanol and 2 drops of piperidine was refluxed for 15 min. The mixture was chilled and the dye was filtered, washed with acetone and water and recrystallized from methanol. The yield of bright orange crystals of dye was 1.5 g., 61% of theoretical. The product melted above 300° C. A methanol solution of the dye has an absorption maximum at 440 mu.

*Example 18.—2-para-dimethylaminostyryl-6,7-dihydro-4-H-pyrano (4,3d) thiazole*

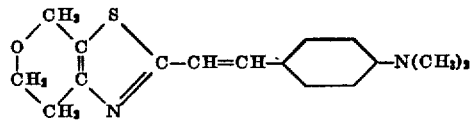

A mixture of 1.55 g. of 2-methyl 6,7-dihydro-4-H-pyrano (4,3d) thiazole, 1.5 g. of p-dimethylaminobenzaldehyde and 0.2 g. anhydrous zinc chloride was heated in a sealed tube at 150° C. for 16 hours. The sticky brown product was recrystallized from methanol. The yield of orange crystals melting at 194–196° with decomposition was 1.5 g., 53% of theoretical. A methanol solution of the dye has an absorption maximum at 395 mu.

*Example 19.—1',3-diethyl-4,5 benzo-6',7'-dihydro-4'-H-thiapyrano (4,3d) thiazolodicarbocyanine iodide*

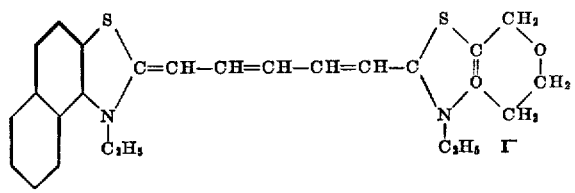

A mixture of 1.05 g. of 2-methyl-6,7-dihydro-4-H-pyrano (4,3d) thiazole ethiodide, 1.75 g. of 2-(4-acetanilido-1,3-butadienyl)-β-naphthothiazole ethiodide, 0.3 g. of triethylamine and 10 ml. of pyridine was refluxed for 5 min. The blue solution was chilled, filtered and the dye was washed on the filter with acetone and water. After recrystallization from methanol the dye was obtained in the form of green crystals which melted at 205–207°. A methanol solution of the dye has absorption maximum at 675 mu.

To sensitize photographic silver halide emulsions with my new dyes, I disperse the dyes in the emulsions. My invention is particularly directed to the customarily employed gelatino-silver-halide emulsions, such as the gelatino-silver-bromide, bromiodide, chloride and chlorobromide for example. The methods of incorporating dyes in emulsions are simple and well known to those skilled in the art, and described in various patents and publications, for example, U.S. Patent No. 2,336,843, patented December 14, 1943.

It is well known that cyanine dyes resonate between two extreme forms and that a cyanine dye can be represented by either of the two extreme forms. Thus, the unsymmetrical type of instant dyes can be represented by either of the following formulas.

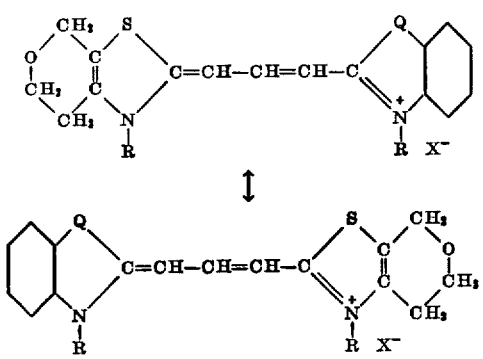

The features of novelty which I believe to be characteristic of my invention are set forth with particularity in the following claims. It should be understood, however, that modifications and changes may be made, without departing from the spirit and substance of my invention, as will be apparent to those skilled in the art.

What I claim as my invention and desire to be secured by Letters Patent of the United States is:

1. A dye selected from the group characterized by the following general formula

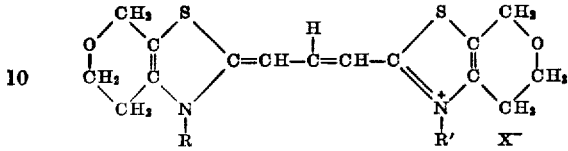

where R and R' respectively represent members selected from the group consisting of alkyl and aralkyl groups, and X⁻ represents an acid radical.

2. 1,1'-dimethyl bis (6,7 dihydro-4-H-pyrano (4,3d) thiazolo) carbocyanine iodide having the following structure

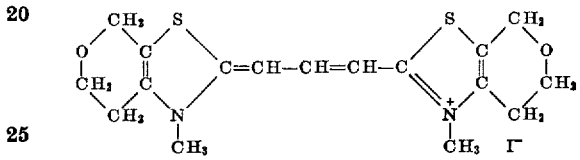

3. 1,1'-diethyl bis (6,7-dihydro-4-H-pyrano (4,3d) thiazolo) carbocyanine iodide.

4. A dye selected from the group characterized by the following general formula

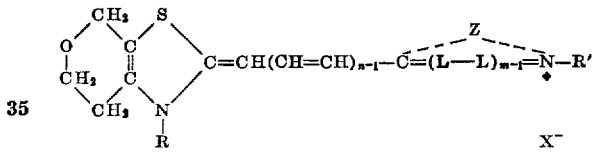

where R and R' respectively represent members selected from the group consisting of alkyl and aralkyl groups, $m$ represents a positive integer from 1 to 2, $n$ represents a positive integer from 1 to 3, L represents a methine group, X⁻ represents an acid radical and Z represents the non-metallic atoms necessary to complete a heterocyclic nucleus containing from 5 to 6 atoms in the heterocyclic ring, said heterocyclic nucleus being selected from the group consisting of a nucleus of the oxazole series, a nucleus of the thiazole series, a nucleus of the thiazoline series, a nucleus of the benzoxazole series, a nucleus of the benzothiazole series, a nucleus of the alpha naphthoxazole series, a nucleus of the beta naphthoxazole series, a nucleus of the alpha naphthothiazole series, a nucleus of the beta naphthothiazole series, a nucleus of the selenazole series, a nucleus of the pyridine series, and a nucleus of the 3,3-dialkyl indolenine series.

5. 1',3-dimethyl-6',1'-dihydro oxa-4'-H-pyrano (4,3d) thiazolocarbocyanine iodide.

6. 1',3 - diethyl - 6',7'-dihydro oxa-4'-H-pyrano-(4,3d) thiazolocarbocyanine iodide.

7. 1',3-dibenzyl-6',7'-dihydro oxa-4'-H-pyrano (4,3d) thiazolocarbocyanine bromide.

8. A dye selected from the group characterized by the following general formula

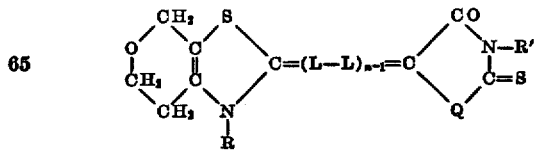

where R is a member selected from the group consisting of alkyl and aralkyl groups, R' is a member selected from the group consisting of alkyl, aralkyl, and aryl groups, L is a methine group, $n$ is a positive integer of from 1 to 4 and Q is a member selected from the group consisting of oxygen, sulfur, selenium and =N—R'.

9. 3-ethyl-5 [(1-ethyl-6,7-dihydro-4-H-pyrano (4,3d) thiazolyl(1,2) idene) ethylidine] rhodanine having the structure

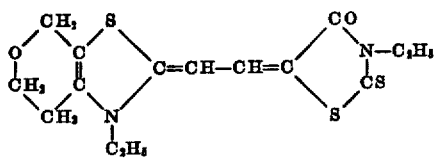

10. A dye selected from the group characterized by the following general formula

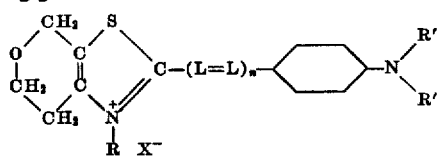

where R and R' represent a member selected from the group consisting of alkyl and aralkyl groups, L represents a methine group, n is a positive integer from one to two, and X⁻ represents an acid radical.

11. 2-paradimethylaminostyryl - 6,7 - dihydro - 4 - H-pyrano (4,3d) thiazole ethiodide having the following structure

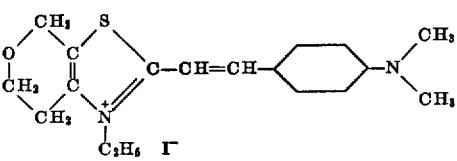

12. A dye selected from the group characterized by the following general formula

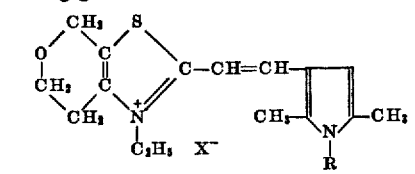

where R represents a member selected from the group consisting of alkyl, aralkyl and aryl groups and X⁻ represents an acid radical.

13. 1'-ethyl-1-phenyl-2,5-dimethyl-6',7'-dihydro - 4'-H-3-pyrolo-pyrano (4,3d) thiazolocarbocyanine iodide having the structure

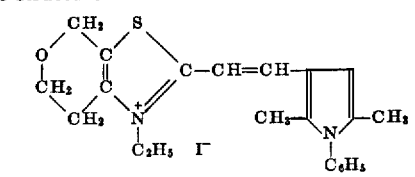

14. A dye having the general formula

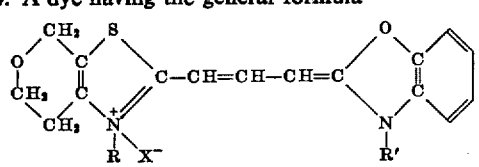

where R and R' respectively represent a member selected from the group consisting of alkyl and aralkyl groups and X⁻ represents an acid radical.

15. A process for preparing symmetrical carbocyanine dyes having the general formula

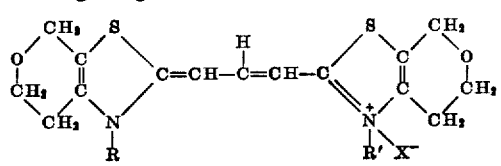

where R and R' respectively represent members selected from the group consisting of alkyl and aralkyl groups and X⁻ represents an acid radical from a quaternary salt having the general formula

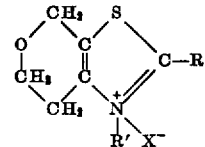

wherein R represents an alkyl radical C_NH_{2N+1}, N is a positive integer of from one to three and R' represents a member selected from the group consisting of alkyl and aralkyl groups and X⁻ represents an anion comprising condensing the quaternary salts with an ester of an ortho-carboxylic acid in an alkaline medium containing at least one constituent selected from the group consisting of pyridine and a mixture of pyridine and triethylamine.

16. A process for preparing unsymmetrical cyanine dyes having the general formula

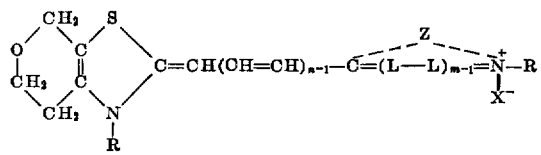

where R and R' respectively represent members selected from the group consisting of alkyl and aralkyl groups, m represents a positive integer of from 1 to 2, n represents a positive integer of from 1 to 3, L represents a methine group, X⁻ represents an acid radical and Z represents the non-metallic atoms necessary to complete a heterocyclic nucleus containing from 5 to 6 atoms in the heterocyclic ring, said heterocyclic nucleus being selected from the group consisting of a nucleus of the oxazole series, a nucleus of the thiazole series, a nucleus of the thiazoline series, a nucleus of the benzoxazole series, a nucleus of the benzothiazole series, a nucleus of the alpha naphthoxazole series, a nucleus of the beta naphthoxazole series, a nucleus of the alpha naphthothiazole series, a nucleus of the beta naphthothiazole series, a nucleus of the selenazole series, a nucleus of the pyridine series, and a nucleus of the 3,3-dialkyl indolenine series from a quaternary salt having the general formula

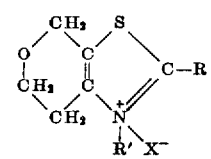

where R represents an alkyl radical C_NH_{2N+1}, N is a positive integer of from one to three, R' represents a member selected from the group consisting of alkyl and aralkyl groups and X⁻ represents an anion comprising condensing the quaternary salt with a heterocyclic ammonium quaternary salt having a reactive constituent selected from the group consisting of aryl aminovinyl and aminobutadienyl groups, halogen atoms and thioether groups in a position selected from the alpha and gamma positions with respect to the nitrogen atom in the heterocyclic ring of said heterocyclic ammonium quaternary salt in the presence of an alkaline condensing agent.

17. A process for preparing merocarbocyanine dyes containing the 6,7-dihydro-4-H-pyrano - (4,3d) - thiazole nucleus and having the general formula

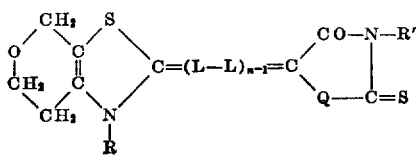

where R is a member selected from the group consisting of alkyl, aralkyl, and aryl groups, L is a methine group, $n$ is a positive integer of from 1 to 4 and Q is a member selected from the group consisting of oxygen, sulfur, selenium and =N—R' comprising condensing a quaternary salt having the general formula

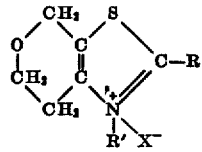

where R represents an alkyl radical $C_NH_{2N+1}$, N is a positive integer of from one to three, R' represents a member selected from the group consisting of alkyl and aralkyl groups and $X^-$ represents an anion with ketomethylene heterocyclic compounds having the ketomethylene heterocyclic ring of said merocarbocyanine dyes and having a reactive arylaminomethylene group in the 5 position with respect to the member represented by Q in the general formula for said merocarbocyanine dye, in an alkaline medium.

18. A process for preparing pyrrolocarbocyanine dyes containing the 6,7-dihydro-4-H-pyrano-(4,3d)-thiazole nucleus comprising condensing a quaternary salt having the general formula

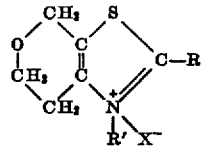

where R represents an alkyl radical $C_NH_{2N+1}$, N is a positive integer of from one to three, R' represents a member selected from the group consisting of alkyl and aralkyl groups, and $X^-$ represents an anion with an agent selected from the group consisting of 1-alkyl and 1-aryl 2,5-dimethyl-3-pyrrole carboxaldehyde in the presence of an alkaline condensing agent.

19. A process for preparing styryl dyes containing the 6,7-dihydro-4-H-pyrano-(4,3d)-thiazole nucleus comprising condensing a quaternary salt having the formula

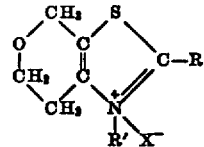

where R represents an alkyl radical $C_NH_{2N+1}$, N is a positive integer of from one to three, R' represents a member selected from the group consisting of alkyl and aralkyl groups, and $X^-$ represents an anion with p-dialkyl aminobenzaldehyde in the presence of an alkaline catalyst.

References Cited in the file of this patent

UNITED STATES PATENTS

| | | |
|---|---|---|
| 2,166,736 | White et al. | July 18, 1939 |
| 2,263,749 | White et al. | Nov. 25, 1941 |
| 2,320,654 | Riester | June 1, 1943 |
| 2,322,015 | Hamer et al. | June 15, 1943 |
| 2,330,203 | Brooker et al. | Sept. 28, 1943 |
| 2,336,463 | Brooker et al. | Dec. 14, 1943 |
| 2,336,843 | Brooker et al. | Dec. 14, 1943 |
| 2,338,782 | Riester | Jan. 11, 1944 |
| 2,340,882 | Kendall | Feb. 8, 1944 |
| 2,353,164 | Kendall et al. | July 11, 1944 |
| 2,495,260 | Jennen et al. | Jan. 24, 1950 |
| 2,692,829 | Aubert et al. | Oct. 26, 1954 |

OTHER REFERENCES

Clerc: "Photography Theory and Practice," 3rd ed., page 151, Pitman Pub. Corp., N.Y., 1942 (Copy in Div. 60.)